3,268,496
CONTINUOUS PROCESS FOR THE POLYMERIZATION OF VINYL ACETATE IN HYDROCARBONS
Leo M. Germain, Shawinigan, Quebec, Canada, assignor to Shawinigan Chemicals Limited, Montreal, Quebec, Canada, a corporation of Canada
No Drawing. Filed Mar. 23, 1964, Ser. No. 354,146
12 Claims. (Cl. 260—85.7)

This application is a continuation-in-part of application Serial No. 87,995 filed February 9, 1961, now abandoned.

This invention relates to a continuous process for producing polymers and copolymers of vinyl acetate. An important object of the invention is the provision of a process for producing vinyl acetate polymers and copolymers in high yield, at low cost, and in the absence of water.

Vinyl esters have previously been polymerized in certain aliphatic hydrocarbons. Hitherto, the polyvinyl esters so formed have been separated from the hydrocarbons by methods such as distillation, evaporation, decantation or filtration.

It has now been found that, in a continuation process for polymerizing vinyl acetate to polyvinyl acetate in the presence of a suitable catalyst in a reaction vessel, it is highly advantageous to select as a liquid medium a saturated hydrocarbon with a density lower than that of polyvinyl acetate, which hydrocarbon is a solvent for the monomer and a non-solvent for the polymer, and to maintain the resulting polyvinyl acetate in a fluid condition at the bottom of the reaction vessel, so that said polyvinyl acetate can be withdrawn from the reaction vessel in the form of a viscous, slow-moving liquid.

The invention therefore consists in a continuous process for polymerizing vinyl acetate which comprises (a) maintaining as a liquid in a reaction vessel at a selected reaction temperature within the range of 60° to 150° C. a saturated hydrocarbon material selected from the group consisting of paraffinic and cycloparaffinic hydrocarbons having at least six carbon atoms, dodecyl benzene, and mixtures of any of the foregoing, (b) substantially continuously adding to said hydrocarbon in said reaction vessel monomeric vinyl acetate and an organic peroxide polymerization catalyst for vinyl acetate, to cause polymerization of said vinyl acetate, (c) allowing the resulting polyvinyl acetate to settle as a separate viscous liquid layer at the bottom of the reaction vessel, and (d) withdrawing the polyvinyl acetate as a liquid from the reaction vessel at substantially the same rate that monomeric vinyl acetate is added to the reaction vessel.

The temperature range within which the process of this invention can be carried out is 60° C. to 150° C. Below 60° C. the polymerization reaction is too slow to be practicable for commercial purposes. Above 150° C. the working pressure in the reaction vessel to which monomeric vinyl acetate is added becomes too high, thereby requiring that the reaction vessel be constructed to withstand high pressures. The preferred temperature range is 80° C. to 120° C. to carry out the polymerization reaction at an optimum speed without resorting to high pressures.

Suitable reaction media for the process of this invention are those saturated hydrocarbons which have a density less than that of the polyvinyl acetate product at the selected polymerization temperature in the range 60–150° C. so that the polyvinyl acetate will settle readily to the bottom of the reaction vessel as it is formed. Suitable hydrocarbons must also be non-solvents for polyvinyl acetate at the polymerization tempertaure. Such suitable hydrocarbons are paraffins and cycloparaffins having at least six carbon atoms, and mixtures of these compounds. Although not a paraffin, dodecyl benzene has been found to be suitable also. The paraffins used can have either branched or unbranched chains, and the cycloparaffins can have paraffinic side chains if desired.

The preferred reaction media are acyclic paraffins having at least ten carbon atoms, their mixtures with each other, and their mixtures with lesser volumes of others of the hydrocarbons which have been listed above. The use of such media causes the polymer which is produced to have a relatively small "free oil" content (as discussed later), and thus makes it more acceptable commercially. Particularly preferred because of their low cost and easy availability are olefin-free petroleum fractions predominantly composed of paraffins having more than ten carbon atoms. Examples of such fractions are purified kerosene, white mineral oil, paraffin wax, and microcrystalline wax.

It is of course necessary that the reaction medium used be a liquid at the chosen reaction temperature. Thus the polymerization must be carried out under pressure if a low boiling reaction medium (for example, cyclohexane) is used at a temperature of polymerization above its boiling point at atmospheric pressure. High melting paraffins are usable even at polymerization temperatures somewhat below their normal melting points, because the reaction medium is composed not only of paraffin but also of vinyl acetate monomer, which serves to dilute the paraffin and to lower its melting point. Thus, for example, n-tetratetracontane ($C_{44}H_{90}$), has a melting point when pure of 88° C., but can be used as a medium for polymerizations carried out at 70° C.

It is necessary that the hydrocarbons used in this invention shall possess no aliphatic double or triple bonds, that is, no ethylenic or acetylenic linkages. The yields of polyvinyl acetate are markedly lower when ethylenically or acetylenically unsaturated compounds are present in the hydrocarbon reaction media. Hydrocarbons with olefinic impurities are treated with concentrated sulfuric acid, for example, to remove ethylenically unsaturated compounds. Hydrocarbons which are mainly or essentially aromatic in character, such as benzene, toluene, xylenes, diphenyl, naphthalene and tetrahydronaphthalene, are usually solvents for polyvinyl acetate at the polymerization temperatures of this invention, and therefore do not permit the separation of the resin product as an immiscible liquid layer. One notable exception is dodecyl benzene, which is wholly suitable for the process of the invention, and is exemplified hereafter. Chlorinated hydrocarbons in which the chlorine atoms form a considerable portion of the molecule generally are solvents for polyvinyl acetate, and furthermore have a density about the same as, or greater than, that of polyvinyl acetate and therefore, even when they are non-solvents, they do not permit the separation of the polyvinyl acetate resin product as a liquid bottom layer in the reaction vessel.

Several organic peroxides are suitable as the reaction initiators or polymerization catalysts for vinyl acetate in saturated hydrocarbons; such catalysts include, for example: benzoyl peroxide, diacetyl peroxide, acetyl benzoyl peroxide, tert-butyl perbenzoate, di-tert-butyl peroxide, lauroyl peroxide and isopropyl percarbonate.

The concentration of catalyst for said polymerization, based upon the weight of monomeric vinyl acetate being fed to the reactor, is conveniently within the range 0.05 percent and 5 percent, and most preferably, for benzoyl peroxide, within the range 0.08 and 2 percent, with generally corresponding preferred percentages for other organic peroxides in proportion to their molecular weight relative to benzoyl peroxide.

The reaction vessel in which the polymerization reaction is to be conducted should be constructed to withstand pressures in excess of 30 pounds per square inch gauge. With high concentrations of active catalysts such as benzoyl peroxide, and temperatures of 120° C. or higher, it is necessary to employ high pressure vessels.

It is advantageous to feed monomeric vinyl acetate, catalyst, and a small proportion (up to 20% by weight of the vinyl acetate) of the hydrocarbon medium more or less continuously into the reaction vessel in which the hydrocarbon medium is maintained at the desired temperature for the polymerization reaction. As the polymerization proceeds, polymer falls to the bottom of the reaction vessel as a fine dispersion, and automatically separates as a distinct liquid layer. An independent heating zone at the bottom of the reactor is advantageous for maintaining the polymer in the liquid state, and at the same time tends to polymerize or to expel upwards into the hydrocarbon medium any unreacted monomer which is present in the polymer product.

It is desirable to withdraw the polyvinyl acetate product, maintained as a viscous liquid by heating, at substantially the same rate that monomeric vinyl acetate is fed into the reactor. However, withdrawal of polymer product should not be started until a substantial amount of polyvinyl acetate has accumulated at the bottom of the reaction vessel, usually at least an hour after the addition of monomer is begun, and a column of at least a few inches in depth of said molten polymer product obviously should be maintained at the bottom of the reactor while the continuous reaction is in progress. Because the polymer product will contain a small proportion of the hydrocarbon medium, it is desirable to add to the reactor additional hydrocarbon together with the monomer, in order to maintain the volume of hydrocarbon medium substantially constant in the reactor, when the reaction is continued over a period of several hours. Withdrawal of the product can be in a substantially continuous manner, or periodically by allowing accumulation of product in the bottom of the reactor for a period and then withdrawing at a relatively faster rate for a short period of time.

The range of viscosity numbers which can most conveniently be attained by the process of this invention is 1.2 to 19. The grade viscosity, or viscosity number, of a polyvinyl acetate resin is a function of its molecular weight. To determine the viscosity number, a sample of the resin is dried at 100° C. for one hour, then 8.6 grams of the resin is dissolved in benzene and diluted to 100 ml. The viscosity of the resulting solution in centipoises at 20° C., as determined in an Ostwald viscometer, is the viscosity number, $V_n$. The higher the viscosity number of the resin, the greater is its molecular weight.

With any given catalyst concentration during the polymerization, the viscosity number of the vinyl acetate polymer product is found to increase as the selected temperature of reaction is decreased. At a given temperature for the polymerization reaction, the viscosity number is found to increase as the catalyst concentration is decreased. Thus the viscosity number of the polymeric product will approach 19 when the polymerization is conducted at 70° C. with 0.05 percent catalyst, and will approach 1.2 when the reaction is carried out at 130° C. with 2–3 percent catalyst, in a pressure vessal. The viscosity number appears to be affected as well by the particular hydrocarbon medium in which polymerization is carried out, but the precise relationship has not been determined.

It is advantageous to add a certain proportion of monomeric vinyl acetate to the liquid hydrocarbon reaction medium, not more than about 75 percent of the total volume, before the beginning of the polymerization reaction, so that the composition of the reaction medium at the beginning of the polymerization reaction will be similar to the composition it will have attained after the relatively steady conditions of continuous polymerization have been established. When quantities of monomer above about 75 percent based on the total volume are employed, the solubility of the polymer product in the reaction medium becomes too great; also, when high temperatures and high catalyst concentrations are employed in addition to high concentrations of monomer, the rate of reaction can become difficult to control. Convenient ratios of hydrocarbon to monomer for the initial reaction medium are 50 to 50 or 40 to 60 by volume. The addition of such monomeric vinyl acetate before the beginning of the polymerization reaction also lowers the melting point of the hydrocarbon material used, and thus allows use of materials which would otherwise be solids at the chosen reaction temperature. Thus n-tetratetracontane (M.P. 88° C.) can be used as a reaction medium at 70° C. when initially admixed with double its own volume of monomer. Higher paraffins would likewise be usable, but are not readily available for experimentation.

The polyvinyl acetate resin as formed by the process of this invention contains from about 2 to about 50 percent (based on the total weight of the resin), of the saturated hydrocarbon which is employed as liquid medium in the reaction vessel, as indicated by assay of the resin product for polyvinyl acetate content. A portion of the saturated hydrocarbon in the resin product is present as a homogeneous admixture, or "free oil," while the remainder is apparently chemically combined with the polyvinyl acetate chain. For this reason it is desirable to replenish the hydrocarbon medium in the reactor as resin product is formed and withdrawn.

When the polymerization is carried out in white mineral oil at 80° C., about one percent of "free oil" is present in the resin product, while for polymerizations at 120° C., the resin product contains an average of 2.3 percent of free mineral oil. Polymerization in cyclohexane at 70° C. gives resin having a free oil content of 51.8%. The proportion of free or uncombined oil present in the resin product is apparently an indication of the solubility of the particular hydrocarbon medium in polyvinyl acetate at the temperature of polymerization. Resins containing more than about 10% free oil are desirably treated to reduce their free oil contents before use or sale. The amount of combined oil in the polymer product increases with catalyst concentration and with the polymerization temperature.

The polyvinyl acetate resins as prepared by the process of this invention are used most advantageously in applications where the presence of water is undesirable but where the presence of small amounts of free hydrocarbon oil or wax is not objectionable, as in certain coating, binder, and adhesive applications. In such applications, the need for drying the resin, and for solvent recovery, is eliminated. Polyvinyl acetates prepared by the process of this invention, with viscosity numbers in the vicinity of 1.2, using a tasteless, non-toxic catalyst and paraffin wax as the liquid medium, are useful in chewing-gum formulations.

When the polyvinyl acetates as prepared by this invention are partially or completely hydrolyzed to polyvinyl alcohols, the products are found to have improved emulsifying properties because of the presence of chemically combined hydrocarbon chains.

The properties of these polyvinyl acetate resins can further be modified by the introduction of up to 20% of copolymerizable monomers with the vinyl acetate monomer fed to the reaction vessel. Suitable comonomers include acrylic acid and its lower alkyl esters, and alkyl-substituted acrylic acids, such as methacrylic acid and crotonic acid, and their lower alkyl esters. "Lower alkyl" esters means those esters containing up to 8 carbon atoms in the alcohol portion of the ester. For example, suitable vinyl acetate-crotonic acid copolymers are soluble in weak alkali, permitting the dissolving with aqueous alkali of adhesives based on such resins, and the consequent recovery of paper treated with same.

The process of this invention is further illustrated by the following examples.

Example 1

An exemplary laboratory reaction vessel for carrying out the process of this invention comprised, as a polymerization zone, an upright cylindrical section of stainless steel, 3 inches in inside diameter and 24 inches long, enclosed in a jacket for heating by means of steam or hot liquid; two stainless steel thermometers entered the reaction zone. A feed-in tube for monomer and catalyst entered the bottom of the same jacketed section. A "Pyrex" glass top-section contained a vent valve, a pressure relief valve, and a pressure gauge. The bottom section consisted of a "Pyrex" glass reducing joint, connected to a stainless steel jacketed section 6 inches long and one inch inside diameter, on the bottom of which was a stainless steel cock valve with a polytetrafluoroethylene (trademark "Teflon") plug.

Run 1. Into the reactor described above was placed 2 litres of a white mineral oil, trade name "Klearol," with the following properties: specific gravity at 60° F.; 0.828–0.838; Saybolt viscosity at 100° F., 55–65; odorless and tasteless; passing U.S.P. acid test and lead oxide test. The oil filled the polymerization zone approximately to the top level of its heating jacket. The oil was heated to 80° C. and monomeric vinyl acetate containing 2 percent by weight (based on the vinyl acetate) of benzoyl peroxide catalyst, was fed continuously through a metering pump at the rate of 540 ml. per hour. To the monomer was also added 50 ml. of the white mineral oil per litre.

Within an hour after the addition of the monomer was begun, polymerized vinyl acetate appeared as a separate layer of liquid at the bottom of the reactor. The jacketed bottom section was maintained at 150° C. The cock valve at the bottom was opened and the polymer was removed continuously as a viscous liquid, at a rate which maintained an approximately constant amount of polymer at the bottom of the reactor. The polymerization reaction was continued for at least six hours.

Three samples of the resulting polyvinyl acetate resin were collected, and the following analyses made:

(a) Viscosity number ($V_n$), determined by measuring in centipoises the viscosity of a molar solution of the resin (86 grams in 1 liter) in benzene at 20° C., in an Ostwald viscometer.

(b) Percent polyvinyl acetate content of the resin, determined by saponification.

(c) "Free oil" content of the resin, in percent, determined by at least one of four methods hereinafter described. In Example 1, the "free oil" was determined by the "haze point" method.

(d) The assumed combined oil, in percent, was obtained by difference:

(100—percent polyvinyl acetate content—percent free oil in resin)

The results for Run 1 are shown in the first line of results in Table I, each of the figures in the columns (a), (b), and (c) being an average of three samples.

A series of runs was carried out similarly to the foregoing, but with the following modifications:

(a) Runs 2 to 6 used successively decreasing amounts of catalyst, but otherwise followed the procedure as described for Run No. 1.

(b) The average pressure in the reactor for Runs 1–6 was between 2 (minimum) and 6 (maximum) pounds per square inch gauge (p.s.i.g.) nitrogen pressure.

(c) Polymer was withdrawn after 2 hours in Run 5, and after 2.5 hours in Run 6. There was some fouling of the reactor in Runs 4–6, the feed rate being in excess of reactor capacity.

(d) Runs 7–12 repeated the procedures, with the temperature of reaction held at 100° C., while Runs 13–18 were carried out at 120° C.

(e) Polymer product was withdrawn after 1.5 hours in Runs 11 and 12.

(f) The working pressure in the reactor for Runs 7–12 was 3–10 pounds gauge. The working pressure in the reactor for Runs 13–17 was 13 p.s.i.g. minimum and 30 p.s.i.g. maximum.

TABLE I.—POLYMERIZATION OF VINYL ACETATE IN WHITE MINERAL OIL

| Run | Percent Catalyst | (a) $V_n$ of Product | (b) PVOAc,[1] Percent in Product | (c) Free Oil, Percent | Combined Oil by difference |
|---|---|---|---|---|---|
| At 80° C.: | | | | | |
| 1 | 2.0 | 1.95 | 93.3 | 1.3 | 5.4 |
| 2 | 1.5 | 2.3 | 93.6 | 1.0 | 5.4 |
| 3 | 1.0 | 2.8 | 94.9 | 0.9 | 4.2 |
| 4 | 0.5 | 3.9 | 96.2 | 0.9 | 2.9 |
| 5 | 0.25 | 5.7 | 97.1 | 0.8 | 2.1 |
| 6 | 0.1 | 8.6 | 97.5 | 1.1 | 1.4 |
| At 100° C.: | | | | | |
| 7 | 2.0 | 1.5 | 88.2 | 1.9 | 9.9 |
| 8 | 1.5 | 1.6 | 89.6 | 1.8 | 8.6 |
| 9 | 1.0 | 1.8 | 91.4 | 1.4 | 7.2 |
| 10 | 0.5 | 2.5 | 92.0 | 1.8 | 6.2 |
| 11 | 0.25 | 3.0 | 95.5 | 1.5 | 3.0 |
| 12 | 0.1 | 4.3 | 95.0 | 1.5 | 3.5 |
| At 120° C.: | | | | | |
| 13 | 1.5 | 1.2 | 86.4 | 2.6 | 11.0 |
| 14 | 1.0 | 1.4 | 88.3 | 2.7 | 9.0 |
| 15 | 0.5 | 1.5 | 90.1 | 2.1 | 7.8 |
| 16 | 0.25 | 1.75 | 91.8 | 1.8 | 6.4 |
| 17 | 0.1 | 2.2 | 93.3 | 2.2 | 4.5 |

[1] PVOAc = Polyvinyl acetate.

It is observed that the viscosity number of the polyvinyl acetate product at a given temperature increases with decreasing catalyst content, while at a given catalyst content, the viscosity number decreases with increasing temperature of reaction.

The apparent combined oil content of the polyvinyl acetate product decreases with decreasing catalyst content, and increases with increasing temperature.

Example 2

In Example 2, the procedure was as described for Example 1, Run 1, but the liquid medium used in the reaction vessel was molten paraffin wax. In Runs 18–21 the catalyst was one percent benzoyl peroxide, based on the weight of vinyl acetate. Four temperatures from 70° C. to 120° C. were used.

TABLE II

| Run | Temperature, ° C. | Product | | |
|---|---|---|---|---|
| | | $V_n$ | Percent PVOAc | Percent Free Oil |
| 18 | 70 | 5.6 | 96.3 | 0.75 |
| 19 | 80 | 3.0 | 95.0 | 0.5 |
| 20 | 100 | 1.6 | 88.0 | 1.0 |
| 21 | 120 | 1.46 | 86.4 | 1.3 |

The same trend towards decreasing viscosity number with increasing temperature is observed as in Example 1.

In Runs 22 and 23, the catalyst was t-butyl perbenzoate, and in Runs 24 and 25, di-tert-butyl peroxide.

TABLE III

| Run | Temperature, ° C. | Catalyst, percent | Product | | |
|---|---|---|---|---|---|
| | | | $V_n$ | Percent PVOAc | Percent Free Oil |
| 22 | 120 | 1 | 1.43 | 84.3 | 1.9 |
| 23 | 120 | 2 | 1.20 | 78.3 | 2.1 |
| 24 | 120 | 1 | 2.8 | 91.5 | 1.15 |
| 25 | 130 | 2 | 1.2 | 73.6 | 3.0 |

The product of Run 25, which used a non-toxic catalyst, is particularly suitable for use in chewing gum formulations, where both paraffin wax and low viscosity polyvinyl acetate can be used, so that separation is unnecessary.

Example 3

In this example, the liquid medium was dodecyl benzene, and the catalyst was one percent benzoyl peroxide. Otherwise the procedure followed that described for Example 1, Run 1. In Run 28, a copolymer was formed by including 10% methyl methacrylate (by weight of the vinyl acetate) in the monomer.

TABLE IV

| Run | Temperature, °C. | Product | | |
|---|---|---|---|---|
| | | $V_n$ | Percent PVOAc | Percent Combined Oil [1] | Percent Free Oil [2] |
| 26 | 80 | 3.1 | 85.9 | 7.5 | 6.6 |
| 27 | 100 | 2.1 | 84.4 | 11.4 | 4.2 |
| 28 | 100 | 2.15 | 80.0 | [3] 15 | |

[1] Determined by ultraviolet spectroscopy.
[2] Obtained by difference (Percent Free Oil) = (100% − Percent PVOAc − Percent Combined Oil).
[3] Accuracy doubtful, due to difficulties in determination.

Example 4

In this example the liquid medium was a light petroleum distillate, a deodorized grade of kerosene (trade name "Deo-base"), which passes the U.S.P. acid test. The catalyst was one percent benzoyl peroxide and the general procedure followed that described for Example 1, Run 1. In Run 33, a copolymer was formed by including 5% (by weight of the vinyl acetate) of crotonic acid.

TABLE V

| Run | Temperature, °C. | Product | | |
|---|---|---|---|---|
| | | $V_n$ | Percent PVOAc | Percent Free Oil |
| 29 | 80 | 2.5 | 93.5 | 4.5 |
| 30 | 100 | 1.7 | 90.5 | 5.3 |
| 31 | 120 | 1.46 | 88.7 | 7.7 |
| 32 | 130 | 1.38 | 88.6 | 8.8 |
| 33 | 100 | 1.85 | 87.2 | ND |

ND = Not determined.

Twenty-five grams of the copolymer resin formed in Run 33 is soluble in 77 ml. of 0.7 percent aqueous ammonium hydroxide.

Run 32 can be carried out without the addition of a polymerization catalyst; the product of such polymerization has a viscosity number of 1.8 and 88.0 percent polyvinyl acetate, but the reaction is too slow for ordinary commercial application.

Example 5

The following experiments were conducted at relatively low temperatures and low catalyst concentrations to obtain higher viscosity polyvinyl acetate. These experiments also employed a hydrocarbon admixed with an equal or greater volume of monomer as the initial polymerization medium.

*Run 34.*—Deodorized kerosene ("Deo-base") and monomeric vinyl acetate were used in equal volumes to provide the reaction medium, a total of three litres. The temperature in the reactor was maintained at 80° C. Vinyl acetate, containing 0.1 percent benzoyl peroxide and 10 percent deodorized kerosene based on the weight of monomer, was fed to the reactor at the rate of 350 ml. per hour. The viscosity of three samples of the product polymer taken at two-hour intervals during the run varied between 10 and 12.5.

*Run 35.*—When the temperature was held at 70° C., and the catalyst concentration was 0.08% benzoyl peroxide, while other conditions were the same as in Run 34, the viscosity of the resulting polymer product was within the range 14 to 16.

*Run 36.*—Deodorized kerosene and vinyl acetate monomer were used in the ratio 40 to 60 by volume, giving a total volume of three litres of initial reaction medium; the temperature in the reactor was maintained at 70° C. Vinyl acetate containing 0.08% benzoyl peroxide and 20 percent deodorized kerosene based on weight of monomer was pumped into the reactor at the rate of 450 ml. per hour. Four samples of the resulting polymer product taken at one hour intervals ranged in viscosity between 16 and 18.

Example 6

The following experiments were conducted using n-paraffins of 95% purity or greater as the reaction media. The reactor was identical to that described in Example 1, except that the polymerization zone was a glass tube having a length of 24 inches and an inside diameter of 1 inch. The reactor was filled in each case with 200 ml. of the particular paraffin being studied and was heated to a temperature as indicated below. Vinyl acetate containing 1% by weight of benzoyl peroxide was added to the reactor at a rate of 126 ml. per hour for Runs 37, 38 and 40, and at a rate of 193 ml. per hour for Run 39. The reactor was maintained at the indicated temperature by means of the water jacket, and was blanketed with nitrogen at 3–6 p.s.i.g. pressure.

Within one hour after the beginning of vinyl acetate addition, polymerized vinyl acetate appeared as a separate layer of liquid at the bottom of the reactor. The valve at the reactor bottom was opened and the polymer was removed continuously as a viscous liquid at a rate which maintained an approximately constant amount of polymer at the bottom of the reactor. The removed polymer was subjected to analysis as described in Example 1.

TABLE VI

| Run | Reaction Medium | Temperature, °C. | Product | | |
|---|---|---|---|---|---|
| | | | $V_a$ | Percent PVOAc | Percent Free Oil |
| 37 | n-Heptane (99%) | 70 | 5.9 | 85.8 | 12.8 |
| 38 | n-Decane (99%) | 90 | 2.6 | 91.1 | 6.4 |
| 39 | n-Tetradecane (95%) | 90 | 2.7 | 89.5 | 6.6 |
| 40 | n-Octacosane (96%) | 100 | 3.5 | 89.7 | 5.1 |

Example 7

To demonstrate the operability of cycloparaffins as reaction media, three runs were carried out using a procedure equivalent to that of Example 6, and using respectively cyclohexane, dimethyl cyclohexane and Decalin (decahydronaphthalene). All were suitable for the process, and in each case polyvinyl acetate separated from the cycloparaffin and could be withdrawn from the reactor bottom as a separate liquid phase. Detailed analysis of the polymer obtained by polymerization at 70° C. in cyclohexane showed it to have a viscosity number of 5.8, a polyvinyl acetate content of 47.2% and a free oil content of 51.8%. Visual examination of the polymers obtained by polymerization in the two other cycloparaffins indicated that they also had high free oil contents, although probably not as high as that of the polymer formed in cyclohexane.

It will be seen from Examples 6 and 7 that use of paraffins with less than ten carbon atoms and cycloparaffins as reaction media gives polymers containing extremely high amounts of free oil. For most applications, free oil contents of more than about 10% are objectionable. Thus, if it is desired to use paraffins with less than ten carbon atoms or cycloparaffins as reaction media, it is usually necessary to separate the free oil from the polymer after the polymer is withdrawn, i.e. by heating the molten polymer and allowing the free oil to evaporate from it. In general, however, it is preferred to use as a reaction medium a hydrocarbon or mixture of hydrocarbons which will give a free oil content of less than 10%. Paraffins having ten or more carbon atoms and dodecyl benzene are suitable in this regard.

The following methods were used to determine the free oil present in the resin products:

(a) White mineral oil and paraffin wax have low solubilities in methanol, and are found to produce a haze in methanol at low concentration and definite temperature which is unchanged by the presence of polyvinyl acetate resin.

Forty grams of polyvinyl acetate resin with the grade viscosity 2.5 was dissolved in 200 ml. of CP methanol and various amounts of white mineral oil, ranging between 0.4 and 3.1 percent based on the weight of the resin, were added, and the haze points determined; similarly, a series of amounts, from 0.5 to 6 percent, of paraffin wax was added to 40 grams of polyvinyl acetate V2.5 in 200 ml. of methanol-benzene (equal volumes) and the haze points determined.

The point of haze appearance was found by cooling a given solution, or the point of haze disappearance by warming the solution.

Graphs were prepared showing the haze points of the polyvinyl acetate solutions containing the various percents of oil or wax.

The free oil content of a resin sample was then determined by dissolving a corresponding quantity of resin product in methanol, or, for paraffin wax, methanol-benzene in equal volumes, and determining the haze point. The approximate percentage of free oil based on the weight of the resin sample was then determined from the corresponding graph.

(b) Samples of the polyvinyl acetate resin products were precipitated four consecutive times from benzene solutions with petroleum ether (B.P. 30° to 60° C.), after which the resin sample was dried and its polyvinyl acetate content determined by saponification. From the percent change in polyvinyl acetate content before and after precipitation, the percentage of non-saponifiable material (assumed to be free oil) lost in the precipitation was calculated. The free oil values quoted in Examples 6 and 7 were found by this method.

(c) The "free oil" could be removed by drying the resin in weighed samples 1 mm. thick at 140° C. under 30 mm. of mercury pressure for 16 hours, in those experiments in which the polymerization medium was sufficiently volatile, e.g. deodorized kerosene and dodecyl benzene.

The "free oil" removed by vacuum drying of the resin products of Runs 30–32 in Example 4 amounted to 5.3, 7.7 and 8.8 percent, respectively.

(d) The percent "combined oil" was determined directly in those experiments in which dodecyl benzene was used as the reaction medium, by ultraviolet spectroscopy. The resin samples were precipitated four times from benzene solution to remove free dodecyl benzene, then dried and examined by ultraviolet spectroscopy.

The "combined oil" values of the resin products of Runs 26–28 (Example 3), determined by U.V. spectroscopy were 11.4, 7.5 and 15 percent respectively.

While it is realized that the product of this invention is not a pure polyvinyl acetate, the proportion of material other than vinyl acetate polymer in the product is so low as to be insignificant for many purposes and generally can be ignored. It will also be understood that additional modifications to those already mentioned can be made in the specific embodiments disclosed without departing from the spirit of the invention or the scope of the claims.

I claim:
1. A continuous process for polymerizing vinyl acetate which comprises
   (a) maintaining as a liquid in a reaction vessel at a selected reaction temperature within the range 60° C. to 150° C., a saturated hydrocarbon material selected from the group consisting of paraffins and cycloparaffins having at least six carbon atoms, dodecyl benzene and mixtures of any of the foregoing;
   (b) substantially continuously adding to said hydrocarbon in said reaction vessel monomeric vinyl acetate and an organic peroxide polymerization catalyst for vinyl acetate, to cause polymerization of said vinyl acetate;
   (c) allowing the resultant polyvinyl acetate to settle as a separate viscous liquid layer at the bottom of the reaction vessel; and
   (d) while maintaining it as a viscous liquid by heating, withdrawing the polyvinyl acetate as a liquid from the reaction vessel at substantially the same rate that monomeric vinyl acetate is added to the reaction vessel.

2. A process as claimed in claim 1, in which a proportion of the saturated hydrocarbon material, up to 20 percent by weight of the vinyl acetate monomer, is also fed to the reaction vessel with the vinyl acetate.

3. A process as claimed in claim 1, in which up to 20 percent, based on the weight of the vinyl acetate monomer, of an ethylenically unsaturated monomer copolymerizable with vinyl acetate, is also introduced to the reaction vessel with the vinyl acetate.

4. A process as claimed in claim 3, in which the ethylenically unsaturated monomer copolymerizable with vinyl acetate is selected from the group consisting of acrylic acid, alkyl-substituted acrylic acids, and lower alkyl esters of said acrylic acid and alkyl-substituted acrylic acids.

5. A process as claimed in claim 1, in which the selected temperature is in the range 70° C. to 130° C.

6. A process as claimed in claim 1, in which the polymerization catalyst is selected from the group consisting of benzoyl peroxide, diacetyl peroxide, acetyl benzoyl peroxide, tert-butyl perbenzoate, di-tert-butyl peroxide, lauroyl peroxide and isopropyl percarbonate.

7. A process as claimed in claim 1, in which the catalyst is between 0.05 and 5% by weight of the vinyl acetate.

8. A process as claimed in claim 1 in which the hydrocarbon material is purified kerosene.

9. A process as claimed in claim 1 in which the hydrocarbon material is white mineral oil.

10. A process as claimed in claim 1 in which the hydrocarbon material is paraffin wax.

11. A process as claimed in claim 1 in which the hydrocarbon material is microcrystalline wax.

12. A process as claimed in claim 1 in which the hydrocarbon material is an acyclic paraffin having at least ten carbon atoms.

References Cited by the Examiner
UNITED STATES PATENTS 2,075,429  3/1931  Douglas _____ 260—89.1
2,841,558  7/1958  Fields _____ 260—89.1

JOSEPH L. SCHOFER, *Primary Examiner.*

J. F. McNALLY, HARRY WONG, JR.,
*Assistant Examiners.*

UNITED STATES PATENT OFFICE
CERTIFICATE OF CORRECTION

Patent No. 3,268,496                      August 23, 1966

Leo M. Germain

It is hereby certified that error appears in the above numbered patent requiring correction and that the said Letters Patent should read as corrected below.

Column 1, line 23, for "continuation" read -- continuous --; column 10, line 15, after "acetate" insert -- to a polymer which is a resin at ambient temperatures --.

Signed and sealed this 22nd day of August 1967.

(SEAL)
Attest:

ERNEST W. SWIDER
Attesting Officer

EDWARD J. BRENNER
Commissioner of Patents